July 23, 1957 L. R. HARPER 2,800,276

ELECTRONIC CONVERSION COUNTER

Filed Dec. 21, 1950 2 Sheets-Sheet 1

Inventor
LEONARD R. HARPER

By

A. J. Etienne

Attorney

July 23, 1957 L. R. HARPER 2,800,276

ELECTRONIC CONVERSION COUNTER

Filed Dec. 21, 1950 2 Sheets-Sheet 2

Inventor
LEONARD R. HARPER

By A. J. Etienne

Attorney 2,800,276

ELECTRONIC CONVERSION COUNTER

Leonard R. Harper, Poughkeepsie, N. Y., assignor to International Business Machines Corporation, New York, N. Y., a corporation of New York Application December 21, 1950, Serial No. 202,119

20 Claims. (Cl. 235—61)

The present invention relates to electronic counters and more particularly to novel means for converting the representation of a number in a counter to a representation of its complement value.

In electronic counters in the prior art, it has become common practice to employ a series of electronic triggers connected in cascade to represent values entered therein by applying pulses to the input of the cascade to thus change the respective "on" and "off" conditions of the respective triggers to thus, by the combination of "on" and "off" conditions, represent the value of the number of pulses so entered. In order to employ such counters commercially in either the decimal or duo-decimal systems, it is necessary to provide means for altering the normal cascade operation of the series of triggers. Also, in the prior art, it has been common practice to subtract a value from a value already entered in a counter by changing the value to be subtracted to its complement value and then adding the complement value to the value already entered.

It has heretofore been proposed to employ means to avoid changing the value to be subtracted by converting the value, already entered, to its complement value within the counter, and then adding the number to be subtracted. This results in the complement of the difference of the two numbers. By converting the last complement the true number difference is obtained. Such means heretofore proposed have been complicated in that there were means required for positively rendering the cascade operation altering means, inoperative, during such conversion and further means have also been required for adding a corrective value, to thus correct for the normal binary operation which ensues when the altering means are rendered inoperative. Still further, means have been required for rendering certain tubes of the counter inoperative in order to prevent pulses produced by the operation of one trigger from flipping a succeeding trigger.

Subsequent to all of these operations, the "on" condition of any trigger is inverted to "off," and the "off" condition of any trigger is inverted to "on," to thus convert the combinational "on" and "off" indication of the number to a combinational "on" and "off" indication of the complement of the same number.

It is, therefore, one of the objects of the present invention to provide a simple conversion counter in which all of the steps, except the last enumerated above, are eliminated.

Another object is to provide a conversion counter which converts a number entered therein to its complement merely by applying a single conversion pulse at a selected point in each of the trigger circuits to invert the respective "on" or "off" conditions of the triggers, thereby producing the complement of a number in a single operation.

A further object is to provide a conversion counter, operable in the decimal system and employing a single step only, for conversion of a value entered in the counter from its original value to its 9's complement.

Another object is to provide a conversion counter operable in th duo-decimal system which employs only a single step for conversion of a value entered in a counter to the 11's complement of the number.

Other objects of the invention will be pointed out in the following description and claims and illustrated in the accompanying drawings, which disclose, by way of examples, the principles of the invention and that the best mode, which has been contemplated, of applying that principle.

Figure 1:
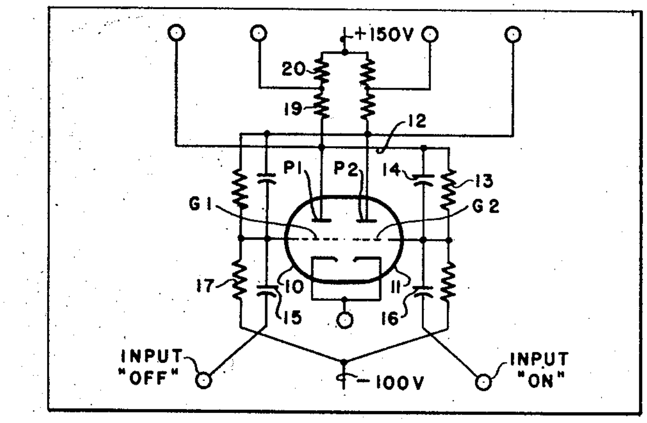
Fig. 1 is a wiring diagram illustrating cross-coupled triodes comprising an electronic trigger employed in the conversion counter.

Referring to the drawings and more particularly to Fig. 1, there is illustrated therein a trigger of the well known Eccles-Jordan type comprising a pair of cross-coupled triodes 10 and 11. These are illustrated as being contained within a single envelope and may, for example, comprise a 6J6 type of tube, but it is to be specifically understood that individual tubes may be employed and that these may comprise tubes other than triodes. Further, throughout the specification, illustrative types of elements and values of components are given, but these are for illustration only having been found particularly efficacious in the circuits, as shown, but it is to be specifically understood that these may be varied within the ambit of those skilled in the art.

Plate P1 of triode 10, is coupled via line 12 and a resistor 13 and condenser 14, in parallel, to the grid G2 of triode 11. The plate P2 of triode 11 is similarly coupled to the grid G1 of triode 10. Resistor 13 may have a value of 200K ohms and condenser 14 may have a value of 100 micromicrofarads. The cathodes of the cross-coupled triodes are connected together and to a terminal, as shown.

The grid G1 is coupled to the "off" input via a condenser 15 and grid G2 is coupled to the "on" input via a condenser 16, each of which may have a value of 40 micromicrofarads. The grids G1 and G2 are connected, respectively, via resistors 17 and 18 to a bias source of −100 volts, the values of each of these resistors also being 200K ohms. Plate P1 is conneced to a source of +150 volts via a pair of series resistors 19 and 20, a suitable value for resistor 19 being 12K ohms and of resistor 20 being 7.5K ohms. The plate P2 is similarly connected to the plus 150 volt source by means of two other resistors, as shown, having the same value, respectively, as 19 and 20.

When a trigger, however, is employed for diode gating control, a more suitable value of the resistors 19 and 20 has been found to be 10K ohms each. As illustrated in Fig. 1, each of the plates P1 and P2 may be provided with both a full plate connection and with a plate tap connection. In the instant application it is assumed that the trigger is "on" when the triode 11 is cut off and triode 10 is conducting, and that the trigger is "off" when triode 11 is conducting and triode 10 is cut off. These conditions are assumed, for example, when a negative pulse is applied to the "on" input and to the "off" input, respectively.

Figure 2:
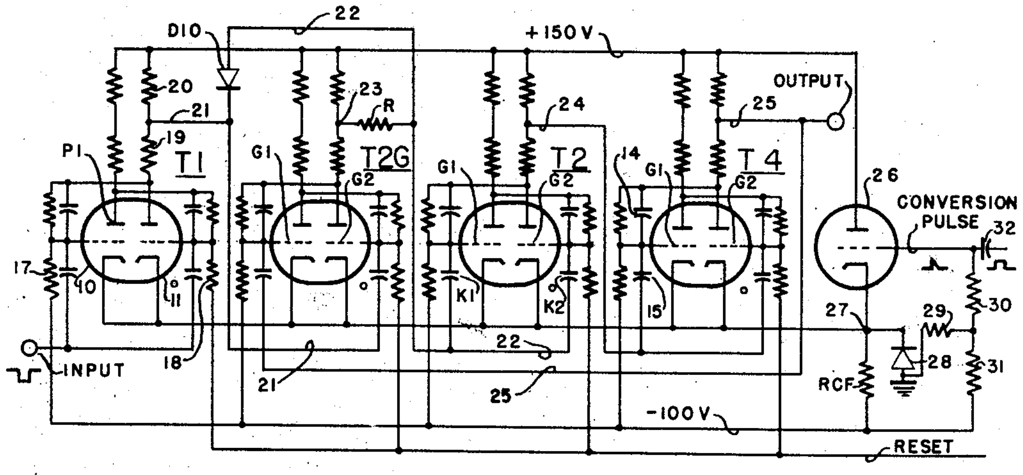
Fig. 2 is a wiring diagram of a decade type conversion counter.

Referring to Fig. 2, four triggers of the type as illustrated in Fig. 1 are connected together, generally in cascade, the alteration in the straight cascade connections being as set forth below. The normal cascade operation is altered to decade operation by means of the gating action of the diode *Dio*, as described in detail in applicant's copending application Serial No. 197,960, filed November 28, 1950, now U. S. Patent No. 2,580,771.

In the normal cascade operation, the operation of the triggers may be referred to as 1-2-4-8 operation, the respective numbers equaling the number of pulses required to be applied to the counter to turn "on" the first, second, third and fourth triggers, respectively. Also, if the first trigger alone is "on," the counter count is one. If the second trigger alone is "on," the count is two. If the third trigger alone is "on," the count is four. If the last trigger alone is "on," the count is eight. Obviously, combinations or patterns of "on" conditions provide an indication of other counts.

The value assigned to any trigger which is "on," may be called the "weight" of the trigger. As shown in Fig. 2, the operation of the four triggers may be defined generally as 1-2-2-4, this being the respective weights attached to the "on" condition of the first, second, third and fourth triggers, respectively, but it is to be particularly noted that these numbers do not indicate the number of pulses to be applied to the input to the counter in order to initially turn on the particular trigger.

By reference to Fig. 2 and to the following Table 1, the operation is briefly as follows:

*Table 1*

| Counter Input Pulses | Triggers | | | |
|---|---|---|---|---|
| | T1 | T2G | T2 | T4 |
| 0 | 0 | 0 | 0 | 0 |
| 1 | X | 0 | 0 | 0 |
| 2 | 0 | X | 0 | 0 |
| 3 | X | X | 0 | 0 |
| 4 | 0 | X | X | 0 |
| 5 | X | X | X | 0 |
| 6 | 0 | X | 0 | X |
| 7 | X | X | 0 | X |
| 8 | 0 | X | X | X |
| 9 | X | X | X | X |
| 10 | 0 | 0 | 0 | 0 |

In the above Table 1, 0 indicates that the trigger is "off" and X that the trigger is "on." It is assumed that all of the triggers are reset "off" by the line labeled Reset which, as is now well known, renders all of the right hand triodes conductive to thus reset all four triggers "off."

The first negative counter input pulse flips trigger T1 "on," as indicated in Table 1. The plus pulse thus produced on line 21 has no effect since the triggers will operate only with negative pulses with the parameters, as indicated. The second pulse applied to the counter input will flip T1 "off." The negative pulse thus produced on line 21 is applied to grid G2 only of trigger T2G, flipping this trigger "on." The plus pulse thus produced on line 22 has no effect on trigger T2. The third counter input pulse flips T1 on with no further effect. The fourth pulse flips T1 "off." The negative pulse thus produced on line 21 has no effect on trigger T2G, since this trigger is already "on." When T2G was turned "on," at the second counter input pulse, its right hand triode became nonconductive, increasing the voltage level at tap 23 which via resistor R and line 22 increases the voltage level on the plate of diode D*io*. This diode may, for example, comprise a G. E. 1N52 crystal diode, although as pointed out in applicant's copending application Serial No. 197,960, filed November 28, 1950, now U. S. Patent No. 2,580,771 with certain parameters, a tube type diode may be employed.

As stated above, on the fourth counter input pulse, T1 is flipped "off" to produce a negative pulse on line 21 which applies this negative pulse to the cathode of diode D*io*, whose plate voltage level at this time is high. Thus by means of the circuit of the A. C. coupled gating diode D*io*, comprising this diode, resistor R, which may assume a value of 47K ohms, line 22 and condenser K2, in the manner as set forth in detail in said copending application Serial No. 197,960, a negative pulse is applied to the grid G2 of trigger T2, to flip T2 "on," as indicated in Table 1.

The fifth counter input pulse flips T1 "on," with no further effect. The sixth pulse flips T1 "off" and via the circuit of the A. C. coupled diode D*io* and condenser K1, a negative pulse is applied to the grid G1 of trigger T2, to flip it "off," as indicated in Table 1. As T2 goes "off," it applies a negative pulse via line 24 to the trigger T4 to flip it "on," also as indicated in Table 1. The seventh counter input pulse flips T1 "on," with no further effect. The eighth pulse flips T1 "off" which in turn via line 21 and the A. C. coupled diode D*io* flips T2 "on." The ninth pulse flips T1 "on," with no further effect.

The tenth pulse flips T1 "off." The negative pulse thus produced on line 21 acts via the A. C. coupled diode D*io* to flip T2 "off." Trigger T2, in going "off," produces a negative pulse on line 24 to flip T4 "off." As T4 goes "off," it produces a negative pulse at the Output and also, via line 25, feeds back a negative pulse to the grid G1 of trigger T2G, flipping this trigger "off," so that on the tenth counter input pulse all triggers are returned to the "off" or normal reset condition and an Output or carry pulse is produced which may carry to another similar counter, if several are connected in series or to another higher order counter of an accumulator composed of a plurality of such counters in parallel.

Thus, by applying a number of pulses to the Input of the counter a value can be entered in the counter equal to the number of pulses so applied, and this value is represented by the combinational code representation of the "on" and "off" conditions of the various triggers.

Novel means are now provided to change the value indication in the radix 10 or 12, for example, to the complement value indication and comprising solely means whereby the pattern of "on" and "off" conditions of the respective triggers representative of any value entered in the particular radix, is converted to a pattern representative of the 9's complement of this value by inverting all "on" triggers to "off" and all "off" triggers to "on." The conversion of a value to complement thereof is accomplished in a single operation comprising the sole step of simultaneously reversing the states of the triggers. These novel means comprise a triode 26 whose plate is connected to the +150 volt source and whose cathode is connected via a resistor $R_{CF}$, which may comprise a 4.3K ohm, 2 watt resistor, to the −100 volt bias source, as shown. All of the cathodes of all of the triodes of the four triggers are connected together as shown and to a point 27 in the cathode follower circuit of triode 26. The diode 28 is connected at its cathode side to the point 27. The plate side is connected to ground and via a resistor 29 of 20K ohms to the junction of a pair of series connected resistors 30 and 31 connected between the grid of triode 26 and the −100 volt bias source. A condenser 32 serves as the input coupling for a positive pulse to be applied to the grid of triode 26, which positive pulse will hereinafter be referred to as the conversion pulse. This will in turn produce a positive pulse at the point 27 which is applied to all the cathodes of all the triodes of all the triggers and is effective to simultaneously flip all the triggers which are "on" to the "off" condition and all triggers which are "off" to the "on" condition. This plus conversion pulse may be of approximately 50 volts amplitude. The grid of triode 26 is initially biased below cut-off by means of the resistors 29, 30 and 31 and the −100 volt bias source, as shown.

In order to normally maintain all of the cathodes at ground potential before application of a plus pulse to the grid of triode 26, the current through diode 28 is adjusted by the connections shown and values as indicated, so that the cathode current in the four triggers plus the diode current will equal the current through resistor $R_{CF}$. In order to reset the counter to zero, a Reset line is provided which, in a manner well known in the art, renders each of the right hand triodes of the four triggers conductive.

Before proceeding to the conversion operation, per se, of the counter, by means of the plus conversion pulse applied to the grid of triode 26, a brief description of trigger operation will make clear just how the triggers are inverted from "on" to "off" or from "off" to "on," without producing operation of the next trigger of the cascade. In other words, since the triggers maintain their normal coupling during 9's conversion, in that the action of none of the tubes is suppressed during such conversion and since no special blocking means are provided, it is necessary that no pulse produced by the flipping of a trigger during such 9's conversion should interfere with the proper conversion operation of a succeeding trigger. Due to the choice of plate-grid and grid input coupling impedances of the triggers, as shown, any change in the "on" or "off" state of a trigger, brought about by the plus conversion pulse, will operate to drive that trigger to its opposite state of stability despite any input pulse produced by the flipping of a preceding trigger.

Upon cut-off of the normally conducting side of a trigger, whether by lowering of the grid potential or increase of the cathode potential, a rapid rise in plate voltage is produced. This immediately applies a positive pulse to the grid of the opposite triode of the same trigger pair to which it is coupled through a condenser, for example, a condenser 14 as in Fig. 1, of 100 micromicrofarads, which is larger than the grid coupling on the other side, such as a condenser 15 as in Fig. 1, which is only 40 micromicrofarads. Thus, the cut-off grid of a trigger when the input coupling condensers are pulsed from a common source will receive a relatively weak negative pulse and a relatively strong positive pulse. The positive pulse will override and the triode will reach a state of full "on." During this operation it applies a negative pulse to the grid of the other triode which in turn is sufficiently strong to override any pulse which may arrive at the input of the grid of the other triode from the operation of a preceding trigger.

Thus, it is seen that positive pulses at the cathode will not only invert a trigger from "on" to "off" or from "off" to "on" but will so invert it regardless of pulses which may arrive at the grid of the trigger within the period of such inversion.

Thus, a positive conversion pulse applied to the grid of triode 26 will deliver a suitable positive pulse of short duration to the cathodes of all the triggers which will invert each trigger even if the trigger, which during cascade operation normally operates it, is delivering a pulse. Thus, the 9's complement conversion ensues at the same repetition rate as that of normal addition in the counter.

Referring now to Fig. 2, and assuming that all the right hand triode are conducting, as indicated by the small circles to the right of each envelope, a plus pulse of approximately 50 volts amplitude applied to the grid of triode 26 will render it conductive so that the voltage at point 27 rises as well as the voltage on all the cathodes of all the triodes of all the triggers. The grids of each right hand triode remain at approximately ground potential and with the cathodes thus raised plus, conduction through the right hand triodes decreases raising the voltages at the plates, which in turn increase the voltage on the left hand grids and thus the left hand triodes are made conductive and the right hand triodes are cut off. Thus, in the example shown, all the triggers in the decade counter are reversed from "off" to "on" and the 9's complement of zero or nine is indicated by the four triggers all being "on."

If a trigger is "on," when the plus conversion pulse is applied, it is turned "off." Assume, for example, that the trigger T2 is "on" and T4 is "off." When the plus pulse is applied to the cathodes of T2 and T4, the right hand triode of T2 starts to conduct and the right hand triode of T4 starts to decrease in its conduction. This conduction of the right hand triode of T2 tends to apply a negative pulse via line 24 to flip trigger T4. However, this negative pulse is applied by means of a 40 micromicrofarad condenser to the left hand grid of T4 while the plus pulse from the right hand plate of T4 is being applied via a 100 micromicrofarad condenser to the left hand grid of T4. Thus, the left hand triode of T4 conducts despite the negative pulse from T2. It should also be remembered that the swing of the plate voltages of the triggers is about 100 volts while the swing of negative pulse applied from one trigger to the next by means of the plate taps, is approximately 38½ volts.

Similarly any negative pulse applied by the diode gating action of D*io* is ineffective to trip a trigger.

Assume, for example, that T4 is "on" and T2 is also "on," prior to application of a plus conversion pulse. The operation is again as described above.

Assume, however, that trigger T2 is "off" and T4 is "on." Upon application of a plus conversion pulse the plus pulse applied from the mid-plate tap of trigger T2 via line 24 to the grid G1 of the left hand triode of T4 is not sufficient, because of the capacity division of trigger T4 and the plate load division of T2, to maintain the left hand triode of T4 conducting. Thus, upon application of the plus conversion pulse, T4 is flipped "off" and its left hand triode becomes non-conducting and its right hand triode becomes conducting.

It is therefore obvious that a simple conversion counter is disclosed for converting a value initially entered into the counter to its 9's complement which is extremely simple in operation, requires no suppression, no blocking, and no added corrective pulses, and that the conversion is produced in a single operation by a single conversion pulse at the same rate as in normal entry into the counter. This novel conversion counter may be employed in any of the well known systems for performing any type of mathematical problem in which the 9's complement of a value is employed, and it is not the intent to be limited to any particular system, applicant's novelty being broadly a simple type of conversion counter, per se.

Figure 3:
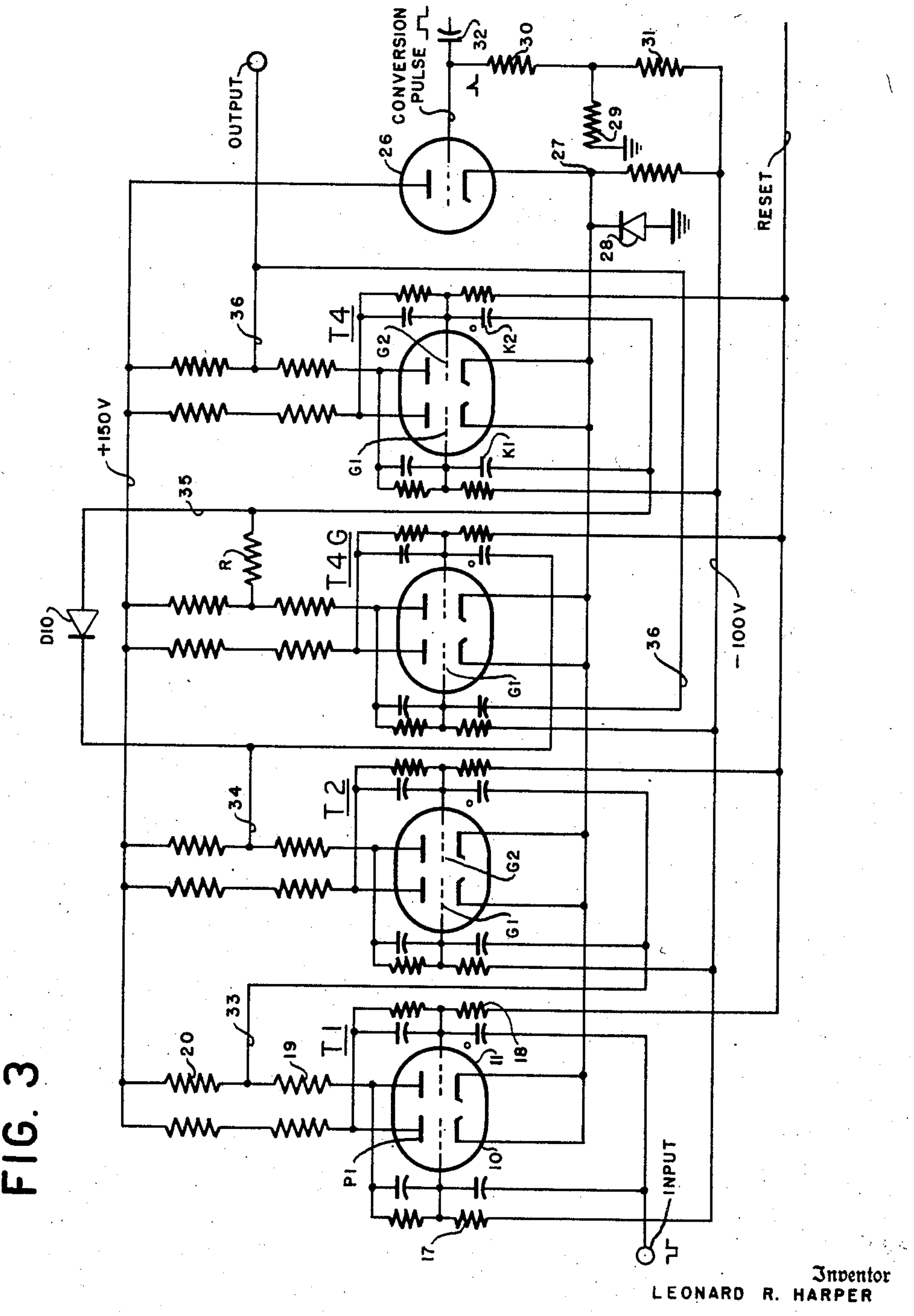
Fig. 3 is a wiring diagram of a duo-decimal type conversion counter.

Referring to Fig. 3, there is disclosed another embodiment of a conversion counter adapted for the duo-decimal system. The conversion portion of this counter is entirely similar to that of Fig. 2 and similar parts are similarly labeled. The triggers are also the same as in Figs. 1 and 2 and similar parts are again similarly labeled. The interconnections among the triggers, however, are different in order to produce duo-decimal instead of decimal operation.

From an inspection of Fig. 3 and the following Table 2, the operation will be obvious.

*Table 2*

| Counter Input Pulses | Triggers | | | |
|---|---|---|---|---|
| | T1 | T2 | T4G | T4 |
| 0 | 0 | 0 | 0 | 0 |
| 1 | X | 0 | 0 | 0 |
| 2 | 0 | X | 0 | 0 |
| 3 | X | X | 0 | 0 |
| 4 | 0 | 0 | X | 0 |
| 5 | X | 0 | X | 0 |
| 6 | 0 | X | X | 0 |
| 7 | X | X | X | 0 |
| 8 | 0 | 0 | X | X |
| 9 | X | 0 | X | X |
| 10 | 0 | X | X | X |
| 11 | X | X | X | X |
| 12 | 0 | 0 | 0 | 0 |

In Table 2, 0 indicates that a trigger is "off" and X that a trigger is "on."

In Fig. 3, all triggers are assumed to be initially "off," with the right hand triode of each trigger conducting as indicated by the small circles to the right of each envelope.

The first counter input pulse flips T1 "on," with no further effect, as is obvious from Table 1. Operation with the second, third, fourth, fifth, sixth and seventh pulses is obvious from Table 2. On the eighth counter input pulse, T1 is flipped "off." The negative pulse thus produced on line 33 flips T2 "off." The negative pulse thus produced on line 34 is ineffective to flip T4G, since a negative pulse on line 34 can only flip T4G "on," and as is seen from Table 2, T4G is already "on." However, when T4G goes "on," at the fourth counter input pulse, the voltage level is raised on the plate side of diode D*io* to prepare it for gating action, as described in detail in said copending application Serial No. 197,960. When the negative pulse is produced on line 34, as stated above, it is applied to the cathode of diode D*io* and by the gating action of D*io*, resistor R, line 35, and condenser K2, a negative pulse is applied to the grid G2 of trigger T4 to flip T4 "on," as illustrated in Table 2.

The operation with the ninth, tenth and eleventh counter input pulses is as shown in Table 2.

The twelfth counter input pulse flips T1 "off." The negative pulse thus produced on line 33 flips T2 "off." The negative pulse thus produced on line 34 has no direct effect on T4G but by means of the gating action of diode D*io* and condenser K1, a negative pulse is applied to grid G1 of T4 to flip T4 "off." The negative pulse thus produced on line 36 is available at the Output and is indicative of a count of twelve. Also, the negative pulse on line 36 is fed back to grid G1 of T4G to flip T4G "off," all as indicated in Table 2. Thus, at the twelfth counter input pulse, the counter is returned to its normal reset condition with all triggers "off," as indicated in Fig. 3.

Assume that the counter of Fig. 3 is loaded with the value eleven. Thus, it is seen by reference to Table 2, triggers T1, T2, T4G and T4 are all "on." Upon application of the plus conversion pulse via condenser 32 to the grid of triode 26, a plus pulse is produced at point 27 which is applied to all cathodes of all triodes of all the triggers, inverting the "on" condition of each trigger to "off," as described in detail above in connection with Fig. 2. Thus, with all triggers T1, T2, T4G, T4 "off," the value indicated is zero, which is the correct 11's complement of the value eleven, originally assumed as entered in the counter.

Novel means have therefore been disclosed whereby the 9's complement of a decimally represented value may be obtained by employment of the counter disclosed in Fig. 2 and application of a single plus conversion pulse and similarly novel means have been disclosed whereby the 11's complement of a duo-decimally represented value may similarly be obtained. It is obvious that the principle of the invention may be applied to any counter in which the radix is greater than two.

While there have been shown and described and pointed out the fundamental novel features of the invention as applied to a plurality of embodiments, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A conversion counter comprising a plurality of cascade connected electronic triggers; means for altering the normal cascade operation from operation in its inherent radix to operation in another radix; input means for entering a value in said counter by setting the triggers to combinations of on and off conditions, mutually exclusively representative of different values entered; means for changing said value indication to its complement value indication in a single step by inverting the on triggers to off and the off triggers to on to produce a complementary indication of the originally entered value in a single step, said means consisting solely of a controllable voltage source and a means for applying a voltage from said source to a point in said counter for directly inverting each of said triggers.

2. A device as in claim 1, wherein the last named means comprises means for applying a voltage to one of the electrodes of each tube of each trigger.

3. A device as in claim 1, said inverting means including a cathode follower circuit, and means including a circuit from the output of said cathode follower to one electrode of each tube of each trigger for applying a voltage from said circuit to said one of the electrodes of each tube of each trigger.

4. A device as in claim 3, said inverting means including means for maintaining each of said electrodes of each tube of each trigger normally at approximately ground potential.

5. A device as in claim 3, said electrodes being cathodes and said cathode follower comprising a triode, a resistor in series with the cathode of said triode, means for applying a positive pulse to the grid of said triode, and means in said cathode follower resistor circuit for applying a positive pulse to said circuit whereby a positive pulse is applied to each of the cathodes of each tube of each trigger.

6. A conversion counter comprising a series of cascade connected electronic triggers, means for altering the straight cascade operation of said triggers including a single diode controlled only by a first one of said triggers for selectively operating a second one of said triggers only in accordance with the status of the first trigger, means for altering the stable state conditions of said triggers to represent by their altered conditions an initially entered value, and means for converting the indication of an entered value to its complement value by inverting the stable state of each trigger.

7. A conversion counter comprising a plurality of cascade connected electronic triggers, means for altering the normal cascade operation to produce operation in a radix other than 2, means for entering a value by altering the stable states of said triggers, each combination of stable states combinationally representing an entered value in said radix, and a single step operating means for converting the indication of an entered value in a single operation to its complement value by inverting the stable states of all said triggers.

8. A pulse operated counter comprising a series of cascade connected electronic triggers, means for altering the normal cascade operation to operation in another radix, means selectively operable to invert the entered value to its complement value whereby subsequent values may be selectively added or subtracted, said means consisting solely of means for selectively operating said triggers.

9. An electronic counter comprising a series of four cascade connected electronic triggers, means interconnecting certain of said triggers and operable to alter the operation from operation in the radix 16 to operation in the radix 10, and single step means effective during a single simultaneous operation to convert a value initially entered in the radix 10 to the 9's complement thereof, said means consisting of circuit means for operating only said triggers during said single simultaneous operation, whereby said complement is produced only by altering the status of said triggers.

10. An electronic counter comprising a series of four cascade connected electronic triggers, means interconnecting certain of said triggers and operable to alter the operation from operation in the radix 16 to operation in the radix 12, and single step means effective during a single simultaneous operation to convert a value initially entered in the radix 12 to the 11's complement thereof, said means consisting of circuit means for operating only said triggers during said single simultaneous operation, whereby said complement is produced only by altering the status of said triggers.

11. An electronic counter comprising a plurality of cascade connected electronic triggers, means for altering the normal cascade operation, means for initially setting the individual triggers to an assumed status, respectively, the conjoint status being indicative of a value entered, a single pulse generating means, and means responsive only to said single pulse generating means for producing the complement of said entered value solely by reversing the stable state of all said triggers.

12. A conversion counter comprising a plurality of straight binary operative triggers; a plurality of carry means interconnecting said triggers, each consisting of circuit means invariably operative to transmit each carry pulse received from one trigger to another; means for altering the straight binary operation to operation in another radix; a single pulse generating means; and means cooperating with said carry means and responsive only to said single pulse generating means for producing the complement of said entered value solely by reversing the stable state of all said triggers.

13. A conversion counter comprising four cascade connected electronic triggers, means for altering the normal cascade operation, means for changing the patterns of on and off status of the triggers to initially represent by any one assumed pattern any desired value entered in said triggers, means for changing a value indication to its complement indication in a single step consisting solely of single step means for reversing the on and off conditions of all said triggers in a single step by simultaneously applying a voltage change to the same electrode of each tube of each trigger.

14. A conversion counter comprising four cascade connected triggers, means for altering the normal cascade operation of said triggers, means initially setting said triggers to a chosen pattern of on and off conditions of the respective triggers, whereby said pattern represents a value represented therein, and means comprising a cathode follower circuit connected to the cathodes of all tubes of said triggers for applying simultaneously to said cathodes a potential to invert the on and off condition of each individual trigger whereby said pattern of on and off conditions is altered to one indicative of the 9's complement of the originally entered value.

15. A conversion counter comprising four cascade connected triggers, means for altering the normal cascade operation of said triggers, means initially setting said triggers to a chosen pattern of on and off conditions of the respective triggers whereby said pattern represents a value entered therein, a triode, a resistor connected in series with the cathode of said triode, means applying a pulse to the grid of said triode, and means including a circuit connecting a point between said cathode and resistor and the cathodes of all tubes for applying a potential derived from said point to the cathodes of all tubes to invert the on or off condition of each individual trigger, whereby said pattern of on and off conditions is altered to one indicative of the 11's complement of the originally entered value.

16. A conversion counter comprising four cascade connected electronic triggers, means for altering the normal cascade operation and means for inverting the assumed status of each of the respective triggers comprising a triode, means applying a pulse to the grid of said triode and means connecting an output of said triode to each of the cathodes of each of the tubes of each trigger for applying an output of said triode to each of the cathodes of each of the tubes of each trigger.

17. A conversion counter comprising four cascade connected triggers each trigger comprising a pair of cross-coupled triodes, means for altering the normal cascade operation, means for selectively setting said triggers whereby certain corresponding triodes of the respective triggers are conductive and certain are non-conductive to represent any desired initially entered value, and means for converting the originally entered value to its complement comprising means applying a positive voltage to the cathodes of all triodes to reverse each of said triggers.

18. A conversion counter comprising four cascade connected triggers, each trigger comprising a pair of cross-coupled triodes, means for altering the normal cascade operation, and means comprising another triode and including means connecting said triode to each of the cathodes of said cross coupled triodes for applying an output potential to each of said cathodes.

19. A conversion counter comprising a series of cascade connected bistable devices, means for altering the straight cascade operation of said devices, means for altering the stable state conditions of said devices to represent by their altered conditions an initially entered value, and means for converting the indication of an entered value to its complement value consisting solely of means for inverting the stable state of each of said devices.

20. A conversion counter comprising the combination of a series of cascade connected bistable devices; a plurality of carry means interconnecting said devices, each consisting of circuit means invariably operative to transmit therethrough each carry pulse received; means for altering the straight cascade operation of said devices; means for altering the stable state conditions of said devices to represent by their altered conditions an initially entered value; and converting means cooperating with said carry means for producing the complement of said entered value consisting solely of means for reversing the stable states of all said devices, said carry means cooperating with said conversion means to override any carry pulses received by each device only during the complementation operation.

References Cited in the file of this patent

UNITED STATES PATENTS

| | | |
|---|---|---|
| 2,489,325 | Ridler | Nov. 29, 1949 |
| 2,512,984 | Trousdale | June 27, 1950 |
| 2,513,442 | Baker | July 4, 1950 |
| 2,538,122 | Potter | Jan. 16, 1951 |
| 2,542,644 | Edson | Feb. 20, 1951 |
| 2,566,933 | Dickinson | Sept. 4, 1951 |
| 2,594,092 | Taylor | Apr. 22, 1952 |
| 2,595,092 | Mounce | Apr. 29, 1952 |
| 2,598,764 | Desch | June 3, 1952 |
| 2,703,202 | Cartwright | Mar. 1, 1955 |

OTHER REFERENCES

Proc. of the IRE, "A Digital Computer for Scientific Applications," by West et al. (pages 1452 through 1460), December 1948.

Electronics Magazine, "High-Speed N-Scale Counters," by T. V. Sharpless, March 1948.

Progress Report on the EDVAC, June 30, 1946, Section III, Miscellaneous Circuits (pages 1-3-4, 1-3-5, dwg, PY-0-126).

Interim Progress Report on the Physical Realization of an Electronic Computing Instrument, by Inst. for Adv. Study, at Princeton, N. J. Published July 28, 1948, pages 99B to 99E.

Proc. of the 12E, vol. 37, No. 7, "Predetermined Electronic Counter" (1 page), July 1949.